(12) United States Patent
Zaynulin et al.

(10) Patent No.: US 11,371,720 B2
(45) Date of Patent: Jun. 28, 2022

(54) THERMAL ENERGY NETWORK AND METHODS OF PROVIDING THERMAL ENERGY

(71) Applicant: Erda Master IPCO Limited, Jersey (GB)

(72) Inventors: Dmitriy Zaynulin, London (GB); Michael Ardis, Worcester (GB); Kevin Stickney, Stratford Upon Avon (GB); Gregory Davis, London (GB); Alban Leiper, London (GB); John Hayes, North Bradley (GB)

(73) Assignee: Erda Master IPCO Limited, St. Heller (GB)

( * ) Notice: Subject to any disclaimer, the term of this patent is extended or adjusted under 35 U.S.C. 154(b) by 322 days.

(21) Appl. No.: 16/423,765

(22) Filed: May 28, 2019

(65) Prior Publication Data

US 2019/0316788 A1    Oct. 17, 2019

Related U.S. Application Data

(63) Continuation of application No. 15/110,043, filed as application No. PCT/EP2015/050361 on Jan. 9, 2015, now abandoned.

(30) Foreign Application Priority Data

Jan. 9, 2014  (GB) .................................... 1400324

(51) Int. Cl.
*F24D 10/00* (2022.01)
*F24D 19/10* (2006.01)
(Continued)

(52) U.S. Cl.
CPC .............. *F24D 10/003* (2013.01); *E03B 7/02* (2013.01); *E03B 7/07* (2013.01); *F24D 10/006* (2013.01);
(Continued)

(58) Field of Classification Search
CPC .............. F24D 10/006; F24D 19/1015; F24D 2200/11; F24D 10/003; E03B 7/02;
(Continued)

(56) References Cited

U.S. PATENT DOCUMENTS 3,838,813 A * 10/1974 Brosenius ............. F24D 10/006
237/13
7,017,650 B2 * 3/2006 Johnson, Jr. ............ E21B 33/13
165/45

(Continued)

FOREIGN PATENT DOCUMENTS

EP      2187135 A2 *  5/2010  ........... F24D 10/003
WO   WO-9520135 A1 *  7/1995  ........... F24D 10/003

OTHER PUBLICATIONS

Langer, et al., EP 2,187,135 A2 English machine translation, May 19, 2010 (Year: 2010).*

*Primary Examiner* — Steven S Anderson, II
*Assistant Examiner* — Phillip Decker
(74) *Attorney, Agent, or Firm* — Polsinelli, PC

(57) ABSTRACT

A thermal energy network interconnecting a plurality of thermal loads and methods of providing thermal energy therebetween, the network and methods including: a primary circuit loop for working fluid, at least two thermal loads thermally connected to the primary circuit loop, at least one of the thermal loads being capable of taking heat from the primary circuit loop and at least one of the thermal loads being capable of rejecting heat into the primary circuit loop, an energy centre connected to the loop and capable of acting as a heat source or a heat sink, and a control system adapted to provide to the primary circuit loop a positive or negative thermal input from the energy centre as a balancing thermal input to compensate for net thermal energy lost to or gained from the at least two thermal loads by the primary circuit loop.

40 Claims, 3 Drawing Sheets

(51) Int. Cl.
 *E03B 7/02* (2006.01)
 *E03B 7/07* (2006.01)
(52) U.S. Cl.
 CPC ...... *F24D 19/1015* (2013.01); *F24D 2200/11* (2013.01); *Y02B 10/40* (2013.01); *Y02B 30/17* (2018.05); *Y02E 20/14* (2013.01)
(58) Field of Classification Search
 CPC .......... E03B 7/07; Y02B 10/40; Y02B 30/17; Y02E 20/14
 See application file for complete search history.

(56) References Cited

U.S. PATENT DOCUMENTS

2011/0197599 A1* 8/2011 Stewart ............... F03G 7/04
 62/56
2012/0279681 A1* 11/2012 Vaughan ............ F24D 10/00
 165/62

* cited by examiner

THERMAL ENERGY NETWORK AND METHODS OF PROVIDING THERMAL ENERGY

FIELD OF THE INVENTION

The present invention relates to a thermal energy network interconnecting a plurality of thermal loads and to a method of providing thermal energy to a plurality of thermal loads. The present invention has particular application to the provision of thermal energy using a district network to an estate of residential, industrial and/or commercial buildings.

BACKGROUND OF THE INVENTION

It is known to connect a thermal energy system to a plurality of buildings to provide heating to the buildings. This arrangement is known in the art as a "district heating system" or "heating network". Buildings are connected at respective connection points to a single loop conveying high-temperature fluid, namely water, around the loop or series of loops and could serve all heating needs within certain areas or the entire cities with its suburbs. A typical heat transfer media is steam or fluid with flow temperature ranging from 70 to 90° C. The steam or hot water is generated at an associated combustion or power plant located on the loop. Such known district heating networks suffer from the problem that a high fluid temperature increases the capital costs, for example because of the need for thermal insulation along the loop, and increases the running costs, and lowers the thermal efficiency, because of high residual thermal losses and temperature drops across the network.

The major problem associated with traditional district heating networks is low utilisation rate; the return on investment in district networks is only can be generated during an intensive active heating season when there is a demand for heating. Therefore, in countries with a rather mild climate settings district heating schemes constitute a rather low share of the total heating demand nationwide. For instance, in the UK district heating represents only about 2% of the total demand for heating energy.

Furthermore, ongoing maintenance of district heating networks is a heavy burden even in countries where the active heating season lasts around six months. This is related to the same problem with low utilisation of an extensive asset such as a district or city wide heating network. In the UK, where the climate is relatively mild, the ongoing maintenance cost associated with maintaining the network is equal to the problem of high capital investment.

It is also known to supplement the district heating network with a parallel cooling network in which water at a typical temperature of about 5° C. is conveyed around a loop consisting of flow and return pipes and provides cooling for air conditioning systems and refrigeration systems. Again, buildings are connected at respective connection points to a single loop conveying low-temperature fluid around the loop. Again, there are high capital costs because of the need for thermal insulation along the loop, increased running costs, and low thermal efficiency.

There is a need in the art for a thermal energy network interconnecting a plurality of thermal loads, for example located in buildings, which has lower capital costs, lower running costs and higher thermal efficiency than known systems and can selectively function as a district heating and/or cooling network for any of the thermal loads connected thereto.

The present invention aims to meet these needs.

SUMMARY OF THE INVENTION

The present invention accordingly provides a thermal energy network interconnecting a plurality of thermal loads, the network comprising:
at least one energy unit capable of functioning as a heat source or a heat sink,
a primary circuit loop for working fluid connected to the energy unit, the primary circuit loop comprising an upstream outflow line and a downstream return line,
a primary pump for pumping the working fluid around the primary circuit loop successively from an outlet of the energy unit along the upstream outflow line, along the downstream return line and back to an inlet of the energy unit,
at least two thermal loads, each thermal load respectively comprising a user circuit loop for working fluid,
each user circuit loop being connected to the primary circuit loop by a respective working fluid connection at a respective location along the primary circuit loop, and
a switchable valve system coupled to each user circuit loop for selectively connecting the user circuit loop to the primary circuit loop in a selected working fluid flow direction within the respective connection so that the primary circuit loop can selectively function as a heat source or a heat sink for the user circuit loop.

The present invention further provides a method of providing thermal energy to a plurality of thermal loads, the method comprising the steps of:
(a) providing an energy unit capable of functioning as a heat source or a heat sink, a primary circuit loop for working fluid being connected to the energy unit, the primary circuit loop comprising an upstream outflow line and a downstream return line,
(b) pumping the working fluid around the primary circuit loop successively from an outlet of the energy unit along the upstream outflow line, along the downstream return line and back to an inlet of the energy unit,
(c) providing in each of at least two thermal loads a respective a user circuit loop for working fluid, each user circuit loop being connected to the primary circuit loop by a respective connection at a respective location along the primary circuit loop, and
(d) selectively connecting the user circuit loop to the primary circuit loop in a selected working fluid flow direction within the connection so that the primary circuit loop selectively functions as a heat source or a heat sink for the user circuit loop.

The present invention still further provides a thermal energy network interconnecting a plurality of thermal loads, the network comprising:
an energy unit capable of functioning as a heat source or a heat sink,
a single primary circuit loop for working fluid connected to the energy unit, the primary circuit loop comprising an upstream outflow line and a downstream return line,
at least two thermal loads, each thermal load respectively comprising a user circuit loop for working fluid,
each user circuit loop being connected to the primary circuit loop by a respective connection at a respective location along the primary circuit loop, and
a control system in the energy unit, the control system being adapted to control the temperature of the working fluid within the primary circuit loop within a preselected target range.

The present invention yet further provides a method of providing thermal energy to a plurality of thermal loads, the method comprising the steps of:
(a) providing an energy unit capable of functioning as a heat source or a heat sink, a single primary circuit loop for working fluid being connected to the energy unit, the primary circuit loop comprising an upstream outflow line and a downstream return line,
(b) providing in each of at least two thermal loads a respective a user circuit loop for working fluid, each user circuit loop being connected to the primary circuit loop by a respective connection at a respective location along the primary circuit loop, and
(c) controlling the temperature of the working fluid within the primary circuit loop within a preselected target range.

The present invention further provides a district energy network interconnecting a plurality of thermal loads and for redistributing thermal energy therebetween, the network comprising:
a primary circuit loop for working fluid,
at least two thermal loads thermally connected to the primary circuit loop, at least one of the thermal loads being capable of taking heat from the primary circuit loop and at least one of the thermal loads being capable of rejecting heat into the primary circuit loop,
an energy centre connected to the loop and capable of acting as a heat source or a heat sink, and
a control system adapted to provide to the primary circuit loop a positive or negative thermal input from the energy centre as a balancing thermal input to compensate for net thermal energy lost to or gained from the at least two thermal loads by the primary circuit loop.

The present invention further provides a method of redistributing thermal energy between a plurality of interconnected thermal loads in a district energy network, the method comprising the steps of:
(i) circulating a working fluid around a primary circuit loop to which at least two thermal loads are thermally connected,
(ii) at least one of the thermal loads taking heat from the primary circuit loop and at least one of the thermal loads rejecting heat into the primary circuit loop,
(iii) an energy centre connected to the loop acting as a heat source or a heat sink, and
(iv) providing to the primary circuit loop a positive or negative thermal input from the energy centre as a balancing thermal input to compensate for net thermal energy lost to or gained from the at least two thermal loads by the primary circuit loop.

The thermal loads may comprise a plurality of separate heating or cooling loads within a single structure or building connected via a single district network.

Preferred features of the apparatus and method of the present invention are defined in the respective dependent claims.

BRIEF DESCRIPTION OF THE DRAWINGS

Embodiments of the present invention will now be described by way of example only, with reference to the accompanying drawings, in which.

DETAILED DESCRIPTION

Figure 1:
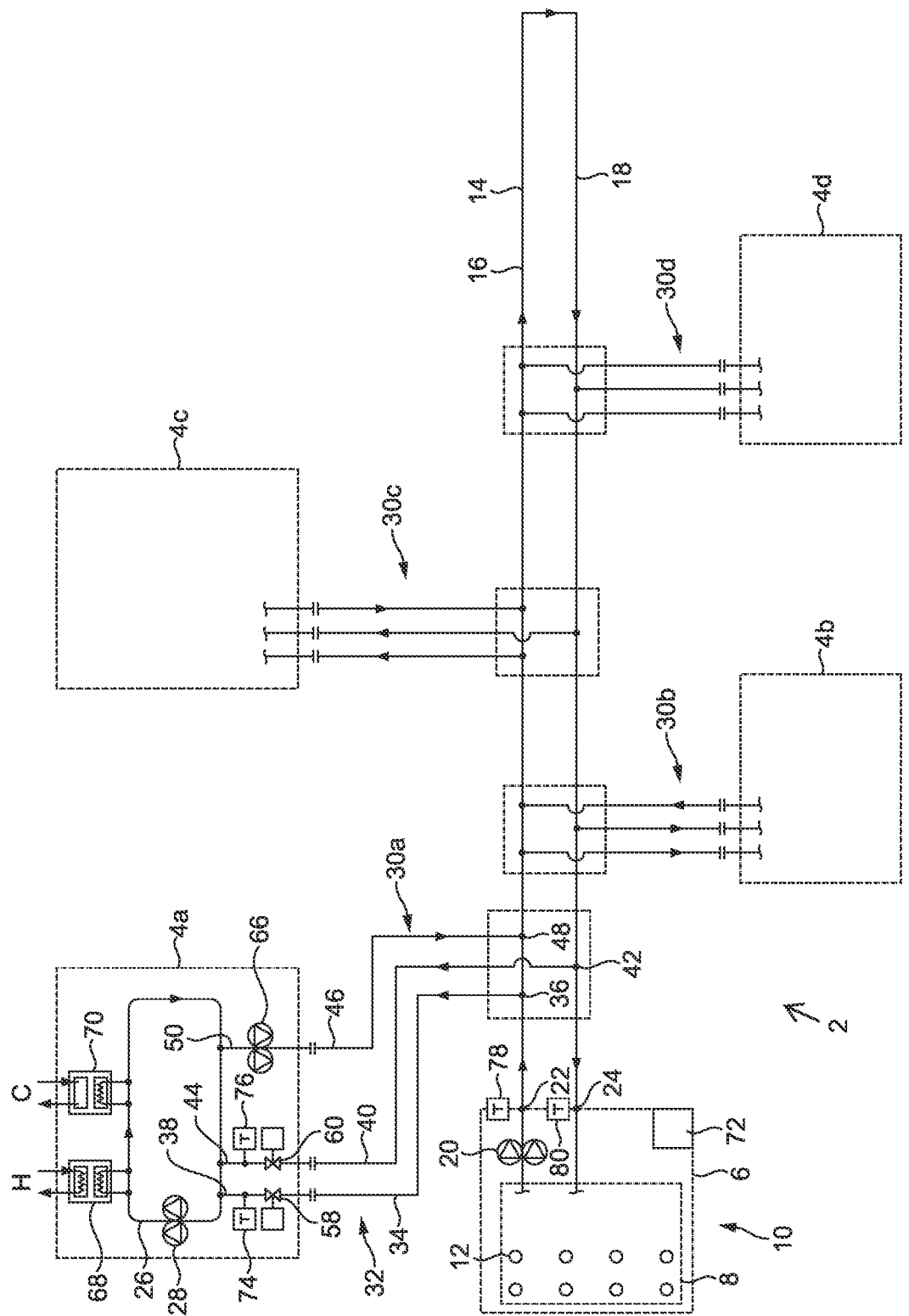
FIG. 1 is a schematic diagram of a thermal energy district network interconnecting a plurality of thermal loads in accordance with a first embodiment of the present invention.

Referring to FIG. 1, there is shown a thermal energy district network 2 interconnecting a plurality of thermal loads, which may preferably be located in buildings 4a, 4b, 4c, 4d, optionally each in a respective building, in accordance with an embodiment of the present invention. Each thermal load comprises at least one device, located in a building, which is requires a positive heat demand, for example a heating system, or a negative heat demand, for example an air-conditioning system or refrigeration system. The district network 2 may extend over an estate of residential, industrial and/or commercial buildings.

The network 2 comprises at least one energy unit 6 capable of functioning as a heat source or a heat sink.

The energy unit 6 comprises any at least one of a geothermal energy unit, a solar energy unit, a boiler unit capable of combusting any carbon-containing fuel, including biomass or recycled material, a combined heat and power (CHP) unit, a liquid reservoir, a source of flowing liquid, a wind or water turbine, a hydroelectric power generator, a nuclear power generator, a ground source or air source heat pump, or any other energy unit capable of functioning as a heat source or a heat sink. Plural such energy units may be provided in any combination and at any location or plurality of locations around the primary circuit loop 14.

In a preferred embodiment, the energy unit 6 may comprise a geothermal energy unit 6 comprising at least one geothermal system 8 installed in the ground 10. The geothermal system 8 comprises at least one borehole heat exchanger 12 having a working fluid therein for thermal energy exchange between the ground 10 and the at least one borehole heat exchanger 12. The borehole heat exchanger 12 is located substantially beneath ground level and comprises any suitable borehole heat exchanger 12 which is capable of extracting thermal energy from the ground when operated in an extraction mode as a heat source, and, conversely, when selectively operated in a replenishment mode as a heat sink, replenishing thermal energy back into the ground. Typically the first borehole heat exchanger system comprises one or more coaxial borehole heat exchangers, for example as disclosed in the Applicant's earlier patent specifications published as GB-A-2450754 or GB-A-2450755. However, any suitable borehole heat exchanger structure or assembly may be employed. The borehole heat exchanger 12 includes a working fluid, typically an aqueous fluid including an alkylene glycol such as propylene glycol as an anti-freeze additive.

The network includes a primary circuit loop 14 for the working fluid which is connected to the energy unit 6. The primary circuit loop 14 comprises an upstream outflow line 16 and a downstream return line 18. There is provided a primary pump 20 for pumping the working fluid around the primary circuit loop 14 successively from an outlet 22 of the energy unit 6, along the upstream outflow line 16, along the downstream return line 18 and back to an inlet 24 of the energy unit 6.

A plurality of buildings, i.e. at least two buildings, but in the illustrated embodiment four buildings 4a, 4b, 4c, 4d are connected to the network 2. Each building 4a, 4b, 4c, 4d respectively comprises a thermal load comprising a user circuit loop 26 for working fluid and a user pump 28 for pumping the working fluid around the respective user circuit loop 26. For clarity, in FIG. 1 only the first building 4a is shown with the respective user circuit loop 26 and associated connections/additional components.

Each user circuit loop 26 is connected to the primary circuit loop 14 by a respective connection 30a, 30b, 30c, 30d at a respective location along the primary circuit loop 14. The connection 30a, 30b, 30c, 30d includes at least three working fluid lines, two lines connecting the user circuit loop 26 to the upstream outflow line 16 and another line connecting the user circuit loop 26 to the downstream return line 18. The connection 30a, 30b, 30c, 30d also includes a switchable valve system 32 coupled to each user circuit loop 26 for selectively connecting the user circuit loop 26 to the primary circuit loop 16 in a selected working fluid flow direction within the respective connection 30a, 30b, 30c, 30d so that the primary circuit loop 16 can selectively function as a heat source or a heat sink for the user circuit loop 26.

In the illustrated embodiment, each connection 30a, 30b, 30c, 30d comprises three working fluid lines. A first working fluid line 34 has an inlet 36 connected to the upstream outflow line 16 and an outlet 38 connected to the user circuit loop 26. A second working fluid line 40 has an inlet 42 connected to the downstream return line 18 and an outlet 44 connected to the user circuit loop 26. A third working fluid line 46 has an outlet 48 connected to the upstream outflow line 16 and an inlet 50 connected to the user circuit loop 26.

In the illustrated embodiment, the switchable valve system 32 is arranged to connect the user circuit loop 26 to either (i) the upstream outflow line 16 by the first working fluid line 34 and the upstream outflow line by the third working fluid line 46 or (ii) downstream return line 18 by the second working fluid line 40 and the upstream outflow line 16 by the third working fluid line 46. The switchable valve system 32 comprises a first control valve 58 on the first working fluid line 34 and a second control valve 60 on the second working fluid line 46. A return pump 66 is on the third working fluid line 46.

In each building 4a, 4b, 4c, 4d, a first heat exchanger 68 is coupled to the respective user circuit loop 26 and connected to a heating system H in the building 4a, 4b, 4c, 4d, and a second heat exchanger 70 is coupled to the respective user circuit loop 26 and connected to a cooling system C in the building 4a, 4b, 4c, 4d.

The district network 2 functions to redistribute thermal energy between a plurality of interconnected thermal loads in the district energy network. The working fluid is circulated around the primary circuit loop 14 to which at least two thermal loads are thermally connected. At least one of the thermal loads may take heat from the primary circuit loop 14 and at least one of the thermal loads may reject heat into the primary circuit loop 14. The energy unit 6 constitutes an energy centre connected to the primary circuit loop 14 and acts as a heat source or a heat sink, which provides to the primary circuit loop 14 a positive or negative thermal input from the energy centre as a balancing thermal input to compensate for net thermal energy lost to or gained from the at least two thermal loads by the primary circuit loop 14.

Figure 2:
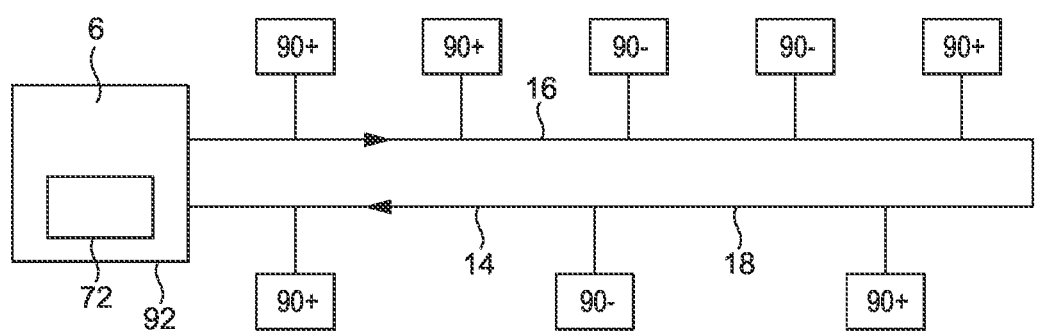
FIG. 2 is a schematic diagram of the thermal energy network of FIG. 1 illustrating energy distribution between the plurality of thermal loads and energy balancing by the energy unit.

As shown in FIG. 2, the plural thermal loads 90 are located around the primary circuit loop 14 to which the energy centre 92 is connected. Each thermal load may comprise one or a plurality of energy devices which may individually have a positive or negative energy demand or collectively may have a net positive or net negative energy demand. At a particular point in time, depending on the operational requirements of the respective thermal loads, the buildings in which they may be located and the seasonal energy requirement, some thermal loads, indicated by a +, have a net positive thermal energy demand and other thermal loads, indicated by a −, have a net negative thermal energy demand. The working fluid circulating around the primary circuit loop 14 meets the respective energy demands. At the energy centre 92 there is a total net energy gain or loss, depending upon the sum of all of the net positive and net negative thermal energy demands around the primary circuit loop 14. The total net energy gain or loss is balanced by a thermal input from the heat source(s) and heat sink(s) in the energy unit 6 in the energy centre 92. The thermal input compensates for net thermal energy lost to or gained from the thermal loads by the primary circuit loop 14.

The result is that thermal energy from the plural thermal loads 90 is redistributed around the primary circuit loop 14. Any thermal load 90+ having a net positive thermal energy demand can indirectly receive, via the primary circuit loop 14, thermal energy from a thermal load 90− having a net negative thermal energy demand. Any thermal load 90− having a net negative thermal energy demand can indirectly reject, via the primary circuit loop 14, thermal energy to a thermal load 90+ having a net positive thermal energy demand. The result is a highly thermally efficient and cost-effective district network which can employ a single primary circuit at a substantially ambient, e.g. 5 to 30° C. depending upon the season, to meet the positive and negative heat demands of plural thermal loads located around the district network.

A control system 72 in the energy unit 6 is adapted to control the thermal energy distribution, and can control the one or heat sources and/or heat sinks in the energy unit 6, for example heat pumps or chillers to manage thermal imbalances in the energy unit, and to control a temperature of the working fluid within the primary circuit loop 14 to be within a preselected target range, which may be seasonally adjusted. Typically, the preselected target range is from 3 to 30° C., the actual temperature optionally depending upon the ambient temperature and/or the season, such as from 5 to 21° C., optionally from 7 to 17° C. or from 9 to 15° C. There may be a target temperature of 12° C.+/−3° C.

The control system 72 is adapted to control the temperature of the working fluid at least partly by controlling the direction and rate of thermal energy exchange between the energy unit 6 and a thermal energy source or store, for example between the ground 10 and at least one borehole heat exchanger 12. This may provide a desired seasonal energy storage and extraction profile. For example, if the ground is used as an energy source and store when using borehole heat exchangers in the energy unit 6, during the summer extracted heat taken from refrigeration or air conditioning units, i.e. constituting a negative heat demand from the thermal loads on the energy unit 6, may be stored in the ground and in the winter that heat may be retrieved from the ground for use in heating systems to constituting a positive heat demand from the thermal loads on the energy unit 6.

The network 2 comprises a first temperature sensor 74 on the first working fluid line 34 and a second temperature sensor 76 on the second working fluid line 40. Each first and second temperature sensor 74, 76 is configured to provide a temperature input to the control system 72. The network 2 further comprises an outlet temperature sensor 78 on the outlet 22 of the energy unit 6 and an inlet temperature sensor 80 on the inlet 24 of the energy unit 6. Each outlet and inlet temperature sensor 78, 80 is configured to provide a temperature input to the control system 72, in order to control of the temperature of the working fluid in the primary circuit loop 14 and energy management within the energy unit 6.

In the method of providing geothermal energy to a plurality of buildings, the working fluid is pumped in a circulatory direction around the primary circuit loop 14 successively from the outlet 22 of the geothermal energy unit 6, along the upstream outflow line 16, along the downstream return line 18 and back to the inlet 24 of the geothermal energy unit 6.

Each user circuit loop 26 is selectively connected, by the switchable valve mechanism 32, to the primary circuit loop 14 in a selected working fluid flow direction within the connection so that the primary circuit loop 14 selectively functions as a heat source or a heat sink for the user circuit loop 26.

The primary circuit loop 14 selectively functions as a heat source for the user circuit loop 26 and thermal energy is supplied to the heating system H from the primary circuit loop 14 via the user circuit loop 26.

Alternatively, the primary circuit loop 14 selectively functions as a heat sink for the user circuit loop 26 and thermal energy is taken from the cooling system C to the primary circuit loop 14 via the user circuit loop 26.

The temperature of the working fluid within the primary circuit loop 14 is controlled within the preselected target range as discussed above. This provides a thermally efficient temperature range for the single primary circuit loop 14 to function selectively as a heat source or a heat sink. The temperature of the working fluid is at least partly controlled by controlling the direction and rate of thermal energy exchange between the energy unit 6 and a thermal energy source or store, for example the ground and the at least one borehole heat exchanger which is conducted in a manner known to those skilled in the art of operating borehole geothermal systems.

The selection of the respective heating or cooling mode is implemented by the switchable valve system 32 which is arranged to connect the user circuit loop 26 to both the upstream outflow line 16 and the downstream return line 18 by a respective pair of the first and third working fluid lines 34, 46, or second and third working fluid lines 40, 46.

As shown in FIG. 1, in a heating mode working fluid flows along the first working fluid line 34 from the upstream outflow line 16 and returns to the upstream outflow line 16 along the third working fluid line 46. This can provide heat to the heating system H via the first heat exchanger 68. The first control valve 58 on the first working fluid line 34 is open and the second control valve 60 on the second working fluid line 40 is closed. Alternatively, in a cooling mode working fluid flows along the second working fluid line 40 from the downstream return line 18 and returns to the upstream outflow line 16 along the third working fluid line 46. This can remove heat from the cooling system C via the second heat exchanger 70. The first control valve 58 on the first working fluid line 34 is closed and the second control valve 60 on the second working fluid line 40 is open. In each case, the pump 66 pumps the working fluid along the third working fluid line 46.

A first working fluid temperature on the first working fluid line 34 and a second working fluid temperature on the second working fluid line 40 may be sensed, providing the first and second temperatures as a temperature input to the control system 72 which can thereby control the fluid flow rate which is circulated around the user circuit loop 26 and/or is diverted from the primary circuit loop 14 to the user circuit loop 26 by controlling one or more of the pumps 28 and 66. Additionally, each thermal load or building may have a respective control system 72 which controls the thermal energy input, as a negative or positive energy, into the respective user circuit loop 26 and the receives the temperature input which is employed to manage the energy input and local working fluid temperature based on the current thermal load.

The outlet working fluid temperature on the outlet 22 of the geothermal energy unit 6 and the inlet working fluid temperature on the inlet 24 of the geothermal energy unit 6 may be sensed, providing the outlet and inlet temperatures as a temperature input to the control system which can thereby control the fluid flow rate around the primary circuit loop 14 by controlling the pump 20. The working fluid temperature may alternatively or additionally be measured at other locations around the primary circuit loop 14, for example at points where the working fluid lines 34, 40, 46 connect to the primary circuit loop 14.

Figure 3:
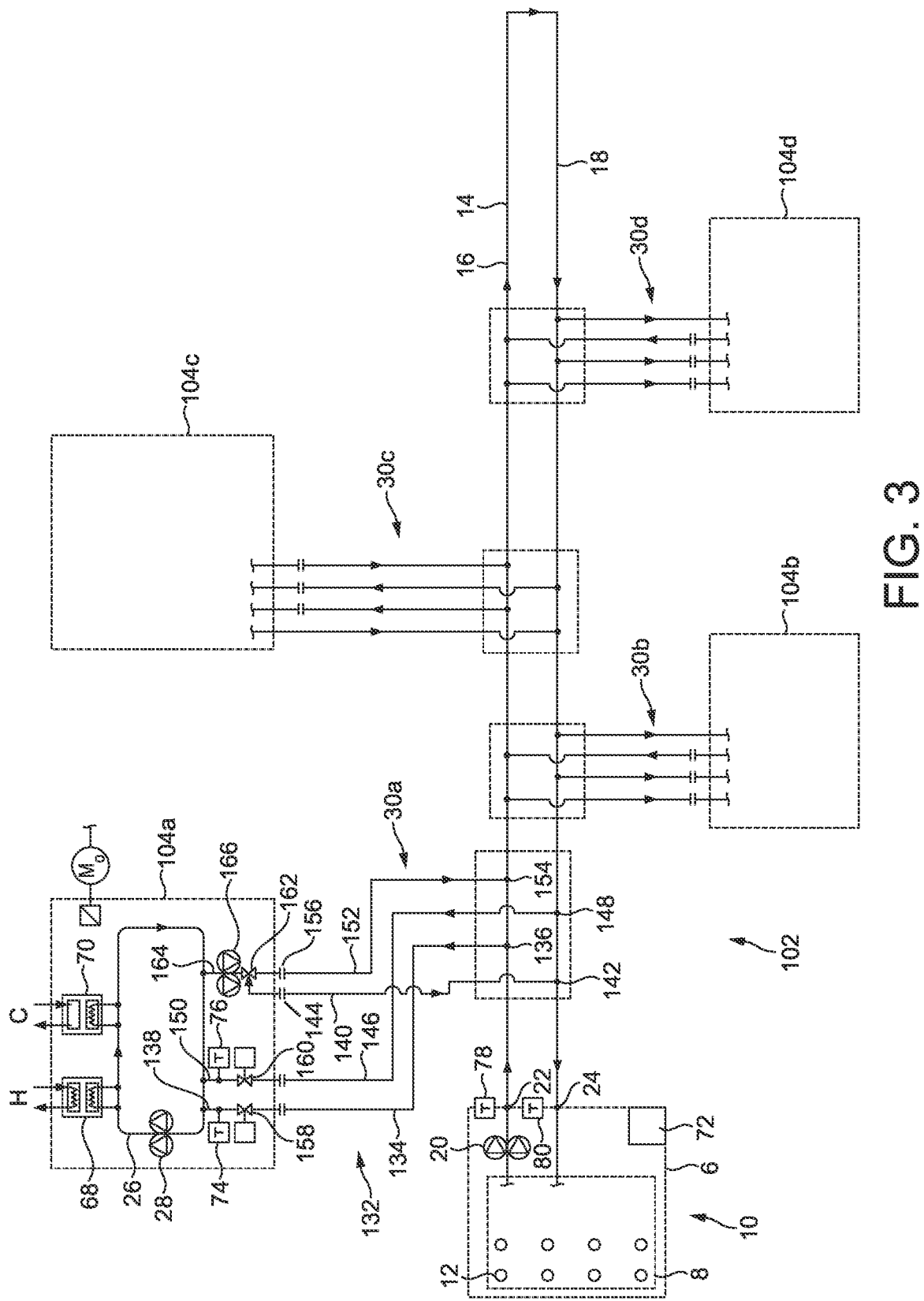
FIG. 3 is a schematic diagram of a thermal energy district network interconnecting a plurality of thermal loads in accordance with a second embodiment of the present invention.

Referring to FIG. 3, there is shown a geothermal energy network 102 interconnecting a plurality of buildings 104a, 104b, 104c, 104d in accordance with a second embodiment of the present invention.

This embodiment is modified as compared to the first embodiment by providing modified connections 30a, 30b, 30c, 30d to the primary circuit loop 14. The connections 30a, 30b, 30c, 30d each include four working fluid lines, two lines connecting the user circuit loop 26 to the upstream outflow line 16 and two lines connecting the user circuit loop 26 to the downstream return line 18.

In the illustrated embodiment, each connection 30a, 30b, 30c, 30d comprises four working fluid lines. A first working fluid line 134 has an inlet 136 connected to the upstream outflow line 16 and an outlet 138 connected to the user circuit loop 26. A second working fluid line 140 has an outlet 142 connected to the downstream return line 18 and an inlet 144 connected to the user circuit loop 26. A third working fluid line 146 has an inlet 148 connected to the downstream return line 18 and an outlet 150 connected to the user circuit loop 26. A fourth working fluid line 152 has an outlet 154 connected to the upstream outflow line 16 and an inlet 156 connected to the user circuit loop 26.

In the illustrated embodiment, the switchable valve system 132 is arranged to connect the user circuit loop 26 to both the upstream outflow line 16 and the downstream return line 18 by a respective pair of the first and second, or third and fourth, working fluid lines 134, 140, 146, 152. The switchable valve system 132 comprises a first control valve 158 on the first working fluid line 134, a second control valve 160 on the third working fluid line 146 and a third three-way valve 162 selectively and alternatively connecting the second working fluid line 140 and the fourth working fluid line 152 to a spur working fluid line 164 connected to the user circuit loop 26. A return pump 166 is on the spur working fluid line 164.

In the method of providing geothermal energy to a plurality of buildings, the working fluid is pumped around the primary circuit loop 14 successively from the outlet 22 of the geothermal energy unit 6, along the upstream outflow line 16, along the downstream return line 18 and back to the inlet 24 of the geothermal energy unit 6.

Each user circuit loop 26 is selectively connected, by the switchable valve mechanism 132, to the primary circuit loop 14 in a selected working fluid flow direction within the connection so that the primary circuit loop 14 selectively functions as a heat source or a heat sink for the user circuit loop 26.

The primary circuit loop 14 selectively functions as a heat source for the user circuit loop 26 and thermal energy is supplied to the heating system H from the primary circuit loop 14 via the user circuit loop 26.

Alternatively, the primary circuit loop 14 selectively functions as a heat sink for the user circuit loop 26 and thermal energy is taken from the cooling system C to the primary circuit loop 14 via the user circuit loop 26.

The temperature of the working fluid within the primary circuit loop 14 is controlled within the preselected target range as discussed above.

The selection of the respective heating or cooling mode is implemented by the switchable valve system 132 which is arranged to connect the user circuit loop 26 to both the upstream outflow line 16 and the downstream return line 18 by a respective pair of the first and second, or third and fourth, working fluid lines 134, 140, 146, 152.

As shown in FIG. 3, in a heating mode working fluid flows along the first working fluid line 134 from the upstream outflow line 16 and returns to the downstream return line 18 along the second working fluid line 140. This can provide heat to the heating system H via the first heat exchanger 68. The first control valve 158 on the first working fluid line 134 is open, the second control valve 160 on the third working fluid line 146 is closed and the third three-way valve 162 selectively connects the second working fluid line 140 to the spur working fluid line 164 connected to the user circuit loop 26, and the fourth working fluid line 152 is closed. The pump 166 pumps the working fluid along the spur working fluid line 164. Alternatively, in a cooling mode working fluid flows along the third working fluid line 146 from the downstream return line 18 and returns to the upstream outflow line 16 along the fourth working fluid line 152. This can remove heat from the cooling system C via the second heat exchanger 70. The first control valve 158 on the first working fluid line 134 is closed, the second control valve 160 on the third working fluid line 146 is open and the third three-way valve 162 selectively connects the fourth working fluid line 152 to the spur working fluid line 164 connected to the user circuit loop 26, and the second working fluid line 140 is closed. The pump 166 pumps the working fluid along the spur working fluid line 164.

A first working fluid temperature on the first working fluid line 134 and a second working fluid temperature on the third working fluid line 146 may be sensed, providing the first and second temperatures as a temperature input to the control system 72 which can thereby control the fluid flow rate which is circulated around the user circuit loop 26 and/or is diverted from the primary circuit loop 14 to the user circuit loop 26 by controlling one or more of the pumps 28 and 66.

The outlet working fluid temperature on the outlet 22 of the geothermal energy unit 6 and the inlet working fluid temperature on the inlet 24 of the geothermal energy unit 6 may be sensed, providing the outlet and inlet temperatures as a temperature input to the control system which can thereby control the fluid flow rate around the primary circuit loop 14 by controlling the pump 20.

The embodiments of the present invention described herein are purely illustrative and do not limit the scope of the claims. For example, alternative modes of operation may be determined based on the particular characteristics of various alternative geothermal systems, borehole heat exchangers, or in-building systems such as ambient air heat exchangers, and/or refrigeration systems.

Yet further, in additional embodiments of the invention, the primary circuit loop may be connected to plural borehole heat exchanger systems, each comprising one or a plurality of borehole heat exchangers.

Various other modifications to the present invention will be readily apparent to those skilled in the art.

The invention claimed is:

1. A thermal energy network interconnecting a plurality of thermal loads, the network comprising:
    at least one energy unit capable of functioning as a heat source or a heat sink,
    a primary circuit loop for working fluid connected to the energy unit, the primary circuit loop consisting of an upstream outflow line and a downstream return line,
    a primary pump for pumping the working fluid around the primary circuit loop successively from an outlet of the energy unit along the upstream outflow line, along the downstream return line and back to an inlet of the energy unit,
    at least two thermal loads, each thermal load respectively comprising a user circuit loop for working fluid,
    each user circuit loop being connected to the primary circuit loop by a respective working fluid connection at a respective location along the primary circuit loop,
    wherein the connection comprises:
    a first working fluid line having an inlet connected to the upstream outflow line and an outlet connected to the user circuit loop,
    a second working fluid line having an inlet connected to the downstream return line and an outlet connected to the user circuit loop, and
    a third working fluid line having an outlet connected to the upstream outflow line at a location downstream of the first working fluid line, and an inlet connected to the user circuit loop, wherein the third working fluid line comprises a return pump configured to return the working fluid to the upstream outflow line through the third working fluid line, and
    a switchable valve system coupled to each user circuit loop for selectively connecting the user circuit loop to the primary circuit loop in a selected working fluid flow direction within the respective connection so that the primary circuit loop can selectively function as a heat source or a heat sink for the user circuit loop,
    wherein the switchable valve system is arranged to connect the user circuit loop to either (i) the upstream outflow line by the first working fluid line and the upstream outflow line by the third working fluid line or (ii) the downstream return line by the second working fluid line and the upstream outflow line by the third working fluid line,
    wherein the first working fluid line of the second thermal load is connected to the primary circuit loop at a location downstream of the third working fluid line of the first thermal load, and
    wherein the second working fluid line of the second thermal load is connected to the primary circuit loop at a location upstream of the second working fluid line of the first thermal load.

2. A thermal energy network according to claim 1 further comprising a fourth working fluid line having an outlet connected to the downstream return line and an inlet connected to the user circuit loop.

3. A thermal energy network according to claim 2 wherein the switchable valve system is arranged to connect the user circuit loop to both the upstream outflow line and the downstream return line by a respective pair of the first and fourth, or second and third, working fluid lines.

4. A thermal energy network according to claim 2 wherein the switchable valve system comprises a first control valve on the first working fluid line, a second control valve on the second working fluid line and a third three-way valve selectively and alternatively connecting the third working fluid line and the fourth working fluid line to a spur working fluid line connected to the user circuit loop.

5. A thermal energy network according to claim 1 further comprising, in each thermal load, a first heat exchanger coupled to the respective user circuit loop and connected to a heating system and a second heat exchanger coupled to the respective user circuit loop and connected to a cooling system.

6. A thermal energy network according to claim 1 further comprising a control system in the energy unit, the control system being adapted to control the temperature of the working fluid within the primary circuit loop within a preselected target range.

7. A thermal energy network according to claim 6 wherein the preselected target range is from 3 to 30° C.

8. A thermal energy network according to claim 7 wherein the preselected target range is from 5 to 21° C.

9. A thermal energy network according to claim 6 wherein the control system is adapted to control the temperature of the working fluid at least partly by controlling the direction and rate of thermal energy exchange between the energy unit and a thermal energy source or store.

10. A thermal energy network according to claim 6 wherein the control system is adapted to control the temperature of the working fluid by providing to the primary circuit loop a positive or negative thermal input from the at least one energy unit capable of functioning as a heat source or a heat sink, the input being a balancing thermal input to compensate for thermal energy lost to or gained from the at least two thermal loads by the primary circuit loop.

11. A thermal energy network according to claim 6 wherein the connection comprises:
 a first working fluid line having an inlet connected to the upstream outflow line and an outlet connected to the user circuit loop,
 a second working fluid line having an inlet connected to the downstream return line and an outlet connected to the user circuit loop, and
 a third working fluid line having an outlet connected to the upstream outflow line and an inlet connected to the user circuit loop, and the network further comprising a first temperature sensor on the first working fluid line and a second temperature sensor on the second working fluid line, each first and second temperature sensor being configured to provide a temperature input to the control system.

12. A thermal energy network according to claim 6 further comprising an outlet temperature sensor on the outlet of the energy unit and an inlet temperature sensor on the inlet of the energy unit, each outlet and inlet temperature sensor being configured to provide a temperature input to the control system.

13. A thermal energy network according to claim 1 wherein the energy unit comprises any at least one of a geothermal energy unit, a solar energy unit, a boiler unit capable of combusting any carbon-containing fuel, including biomass or recycled material, a combined heat and power (CHP) unit, a liquid reservoir, a source of flowing liquid, a wind or water turbine, a hydroelectric power generator, a nuclear power generator, a ground source or air source heat pump, or any other energy unit capable of functioning as a heat source or a heat sink.

14. A thermal energy network according to claim 13 wherein the energy unit comprises at least one geothermal system installed in the ground, the geothermal system comprising at least one borehole heat exchanger having a working fluid therein for thermal energy exchange between the ground and the at least one borehole heat exchanger.

15. A thermal energy network according to claim 1 wherein each thermal load is located in a building.

16. A thermal energy network according to claim 15 wherein each thermal load is located in a respective building.

17. A thermal energy network according to claim 15 wherein each thermal load comprises at least one device, located in a building, which is capable of requiring a positive or negative heat demand.

18. A method of providing thermal energy to a plurality of thermal loads, the method comprising the steps of:
 (a) providing an energy unit capable of functioning as a heat source or a heat sink, a primary circuit loop for working fluid being connected to the energy unit, the primary circuit loop consisting of an upstream outflow line and a downstream return line,
 (b) pumping the working fluid around the primary circuit loop successively from an outlet of the energy unit along the upstream outflow line, along the downstream return line and back to an inlet of the energy unit,
 (c) providing in each of at least two thermal loads a respective a user circuit loop for working fluid, each user circuit loop being connected to the primary circuit loop by a respective connection at a respective location along the primary circuit loop,
 wherein the connection comprises:
 a first working fluid line having an inlet connected to the upstream outflow line and an outlet connected to the user circuit loop,
 a second working fluid line having an inlet connected to the downstream return line and an outlet connected to the user circuit loop, and
 a third working fluid line having an outlet connected to the upstream outflow line at a location downstream of the first working fluid line, and an inlet connected to the user circuit loop, wherein the third working fluid line comprises a return pump that returns the working fluid to the upstream outflow line through the third working fluid line, and
 (d) selectively connecting the user circuit loop to the primary circuit loop in a selected working fluid flow direction within the connection so that the primary circuit loop selectively functions as a heat source or a heat sink for the user circuit loop, the selective connectivity implemented by a switchable valve system which is arranged to connect the user circuit loop to the upstream outflow line by either the first or second working fluid lines and to the downstream return line by the third working fluid line.

19. A method according to claim 18 further comprising the step (e) of providing in each thermal load a first heat exchanger coupled to the respective user circuit loop and connected to a heating system and a second heat exchanger coupled to the respective user circuit loop and connected to a cooling system.

20. A method according to claim 19 further comprising the step (f) wherein the primary circuit loop selectively functions as a heat source for the user circuit loop and thermal energy is supplied to the heating system from the primary circuit loop via the user circuit loop.

21. A method according to claim 19 further comprising the step (f) wherein the primary circuit loop selectively functions as a heat sink for the user circuit loop and thermal energy is taken from the cooling system to the primary circuit loop via the user circuit loop.

22. A method according to claim 19 wherein in a heating mode working fluid flows along one working fluid line from the upstream outflow line and returns to the upstream outflow line along another working fluid line to provide heat to the heating system via the first heat exchanger.

23. A method according to claim 19 wherein in a cooling mode working fluid flows along one working fluid line from the downstream return line and returns to the upstream outflow line along another working fluid line to remove heat from the cooling system via the second heat exchanger.

24. A method according to claim 18 further comprising the step (e) of controlling the temperature of the working fluid within the primary circuit loop within a preselected target range.

25. A method according to claim 24 wherein the preselected target range is from 7 to 17° C.

26. A method according to claim 25 wherein the preselected target range is from 9 to 15° C.

27. A method according to claim 24 wherein in step (e) controlling the temperature of the working fluid is at least partly achieved by controlling the direction and rate of thermal energy exchange between the energy unit and a thermal energy source or store.

28. A method according to claim 27 further comprising sensing an outlet temperature on the outlet of the energy unit and an inlet temperature on the inlet of the energy unit and providing the outlet and inlet temperatures as a temperature input to a control system implementing step (e).

29. A method according to claim 18 wherein in a heating mode a first control valve of the switchable valve system the first working fluid line is open, a second control valve of the switchable valve system on the second working fluid line is closed and the third working fluid line is open.

30. A method according to claim 18 wherein in a cooling mode a first control valve of the switchable valve system on the first working fluid line is closed, a second control valve of the switchable valve system on the second working fluid line is open and the third working fluid line is open.

31. A method according to claim 18 further comprising a fourth working fluid line having an outlet connected to the downstream return line and an inlet connected to the user circuit loop.

32. A method according to claim 31 wherein step (d) is implemented by a switchable valve system which is arranged to connect the user circuit loop to both the upstream outflow line and the downstream return line by a respective pair of the first and fourth, or second and third, working fluid lines.

33. A method according to claim 32 wherein the switchable valve system comprises a first control valve on the first working fluid line, a second control valve on the second working fluid line and a third three-way valve selectively and alternatively connecting the third working fluid line and the fourth working fluid line to a spur working fluid line connected to the user circuit loop.

34. A method according to claim 18 further comprising the step (e) of controlling the temperature of the working fluid within the primary circuit loop within a preselected target range, wherein in step (e) controlling the temperature of the working fluid is at least partly achieved by controlling the direction and rate of thermal energy exchange between the energy unit and a thermal energy source or store and the method further comprises sensing a first temperature on the first working fluid line and a second temperature on the second working fluid line, and providing the first and second temperatures as a temperature input to a control system implementing step (e).

35. A method according to claim 18 wherein the temperature of the working fluid is controlled by providing to the primary circuit loop a positive or negative thermal input from the at least one energy unit capable of functioning as a heat source or a heat sink, the input being a balancing thermal input to compensate for thermal energy lost to or gained from the at least two thermal loads by the primary circuit loop.

36. A method according to claim 18 wherein the energy unit comprises any at least one of a geothermal energy unit, a solar energy unit, a boiler unit capable of combusting any carbon-containing fuel, including biomass or recycled material, a combined heat and power (CHP) unit, a liquid reservoir, a source of flowing liquid, a wind or water turbine, a hydroelectric power generator, a nuclear power generator, a ground source or air source heat pump, or any other energy unit capable of functioning as a heat source or a heat sink.

37. A method according to claim 36 wherein the energy unit comprises at least one geothermal system installed in the ground, the geothermal system comprising at least one borehole heat exchanger having a working fluid therein for thermal energy exchange between the ground and the at least one borehole heat exchanger.

38. A method according to claim 18 wherein each thermal load is located in a building.

39. A method according to claim 38 wherein each thermal load is located in a respective building.

40. A method according to claim 38 wherein each thermal load comprises at least one device, located in a building, which is requires a positive or negative heat demand.

* * * * *